United States Patent
Rauner et al.

(10) Patent No.: US 10,328,926 B2
(45) Date of Patent: Jun. 25, 2019

(54) METHOD AND CONTROL DEVICE FOR OPERATING A HYBRID VEHICLE

(71) Applicant: Dr. Ing. h.c. F. Porsche Aktiengesellschaft, Stuttgart (DE)

(72) Inventors: Thomas Rauner, Blaubeuren (DE); Thomas Beck, Renningen (DE); Francesco Piccolo, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/716,543

(22) Filed: Sep. 27, 2017

(65) Prior Publication Data

US 2018/0093658 A1    Apr. 5, 2018

(30) Foreign Application Priority Data

Oct. 5, 2016    (DE) .................. 10 2016 118 786

(51) Int. Cl.

| | |
|---|---|
| *B60W 10/06* | (2006.01) |
| *B60W 20/15* | (2016.01) |
| *B60W 10/24* | (2006.01) |
| *F02D 19/06* | (2006.01) |
| *F02D 41/00* | (2006.01) |

(Continued)

(52) U.S. Cl.
CPC ....... *B60W 20/15* (2016.01); *B60K 15/03519* (2013.01); *B60W 10/06* (2013.01); *B60W 10/24* (2013.01); *F02D 19/0621* (2013.01); *F02D 29/02* (2013.01); *F02D 41/0032* (2013.01); *F02D 41/221* (2013.01); *F02M 25/08* (2013.01); *F02M 25/0836* (2013.01); *B60K 2015/03566* (2013.01); *B60K 2015/03571* (2013.01); *F02D 2200/0414* (2013.01); *F02D 2200/0602* (2013.01);

(Continued)

(58) Field of Classification Search
CPC ....... B60W 20/15; B60W 10/06; B60W 10/24
See application file for complete search history.

(56) References Cited

U.S. PATENT DOCUMENTS

| | | |
|---|---|---|
| 8,104,454 B2 | 1/2012 | Schondorf et al. |
| 9,328,678 B2 | 5/2016 | Bohr et al. |

(Continued)

FOREIGN PATENT DOCUMENTS

| | | |
|---|---|---|
| DE | 10162067 A1 | 10/2002 |
| DE | 10200016 B4 | 10/2002 |

(Continued)

*Primary Examiner* — Erez Gurari (74) *Attorney, Agent, or Firm* — Leydig, Voit & Mayer, Ltd.

(57) ABSTRACT

A method for operating a hybrid vehicle, wherein the hybrid vehicle has an electric engine, an electric traction energy accumulator interacting with the electric engine, an internal combustion engine, and a fuel tank interacting with the internal combustion engine, includes starting from a purely electric driving mode in which the internal combustion engine is shut down and in which a shut-off valve of the fuel tank is closed, opening the shut-off valve of the fuel tank and starting up the internal combustion engine depending on defined operating conditions. The defined operating conditions include a current charging state of the traction energy accumulator and a current pressure in the fuel tank.

12 Claims, 4 Drawing Sheets

(51) Int. Cl.
*F02M 25/08* (2006.01)
*F02D 41/22* (2006.01)
*F02D 29/02* (2006.01)
*B60K 15/035* (2006.01)

(52) U.S. Cl.
CPC .. *F02D 2200/503* (2013.01); *F02D 2200/701* (2013.01); *F02D 2200/703* (2013.01)

(56) References Cited

U.S. PATENT DOCUMENTS

| | | |
|---|---|---|
| 2002/0079149 A1 | 6/2002 | Kotre et al. |
| 2002/0083930 A1 | 7/2002 | Robichaux et al. |
| 2006/0053868 A1* | 3/2006 | Chung ............... B60K 6/44 73/49.7 |
| 2008/0041645 A1* | 2/2008 | Bauerle ............. B60W 10/08 180/65.28 |
| 2008/0147294 A1* | 6/2008 | Tomatsuri ......... F02D 41/0055 701/102 |
| 2012/0095631 A1 | 4/2012 | Rauner |
| 2014/0052361 A1 | 2/2014 | Blumenstock et al. |
| 2014/0114550 A1* | 4/2014 | Bohr ................. F02D 41/0037 701/102 |
| 2015/0090232 A1* | 4/2015 | Peters ............... F02M 25/0854 123/520 |
| 2015/0120108 A1* | 4/2015 | Dudar ............... F02M 25/089 701/22 |
| 2017/0066322 A1* | 3/2017 | Dudar ............... B60W 20/00 |
| 2017/0114744 A1* | 4/2017 | Martin .............. F02M 25/0818 |
| 2017/0320485 A1* | 11/2017 | Miller ............... B60W 20/40 |
| 2017/0321616 A1* | 11/2017 | Miller ............... F02D 19/0615 |
| 2018/0017028 A1* | 1/2018 | Kalyuta ............. F02M 37/025 |
| 2018/0072304 A1* | 3/2018 | Cyr .................. B60W 20/14 |
| 2018/0093657 A1* | 4/2018 | Pietron .............. B60W 10/02 |
| 2018/0118185 A1* | 5/2018 | Frait ................. B60W 10/113 |

FOREIGN PATENT DOCUMENTS

| | | |
|---|---|---|
| DE | 102009009901 A1 | 8/2010 |
| DE | 102010038147 A1 | 4/2012 |
| DE | 102012214631 A1 | 2/2014 |
| JP | 2001121979 A | 5/2001 |
| JP | 2009191758 A | 8/2009 |
| JP | 2009275683 A | 11/2009 |

\* cited by examiner

METHOD AND CONTROL DEVICE FOR OPERATING A HYBRID VEHICLE

CROSS REFERENCE TO RELATED APPLICATIONS

This application claims benefit to German Patent Application No. DE 10 2016 118 786.0, filed Oct. 5, 2016, which is hereby incorporated by reference herein.

FIELD

The invention relates to a method for operating a hybrid vehicle. Furthermore, the invention relates to a control device for carrying out the method.

BACKGROUND

A hybrid vehicle comprises an internal combustion engine as a first drive source and an electric engine as a second drive source. Fuel can be fed to the internal combustion engine from a fuel tank. The electric engine interacts with an electric traction energy accumulator, wherein the electric traction energy accumulator is more intensely discharged in the motor mode of the electric engine and is more intensely charged in the generator mode of the electric engine.

It is already known in practice, depending on defined operating conditions of the hybrid vehicle, to change between a purely electric driving mode, in which only the electric engine provides driving power, a purely internal combustion engine driving mode, in which only the internal combustion engine provides driving power, and a hybrid driving mode, in which both the internal combustion engine and the electric engine provide driving power. It is known in this connection, starting from a purely electric driving mode, to start up the internal combustion engine depending on defined operating conditions. This takes place in the case of hybrid vehicles known in practice when the charging state of the traction energy accumulator is not sufficient to provide the desired driving power solely via the electric engine.

It is furthermore known in practice that when, in a purely electric driving mode of the hybrid vehicle, the internal combustion engine is shut down, a shut-off valve assigned to the fuel tank is closed. This avoids hydrocarbon gas or fuel vapor being able to emerge from the fuel tank and being able to escape into an activated carbon filter or even into the surroundings.

Since, however, a fuel tank is configured merely to a defined pressure, when the pressure in the fuel tank exceeds a limit value, the shut-off valve of the fuel tank has to be opened such that hydrocarbon gas or fuel vapor then escapes into the activated carbon filter or even into the surroundings of the motor vehicle. In particular, hydrocarbon gas or fuel vapor escapes into the surroundings of the motor vehicle whenever the activated carbon filter is already loaded with hydrocarbons to an extent such that said activated carbon filter can no longer absorb any additional loading with hydrocarbons.

U.S. Pat. No. 8,104,454 B2 discloses a method for operating a hybrid vehicle, in which an internal combustion engine is started and fuel vapor is removed from the fuel tank as a function of a first amount of liquid fuel located in a motor vehicle and depending on a first duration of time of a preceding refueling operation. As a function of a second amount of liquid fuel located in the fuel tank and a second period of time since the first refueling operation, fuel vapor is removed from the fuel canister depending on operating conditions of the internal combustion engine.

It is known from DE 102 00 016 B4 to flush a fuel tank of a hybrid vehicle, specifically as a function of a pressure in the fuel tank.

U.S. Pat. No. 9,328,678 B2 discloses a method in which operating conditions of a drive are adapted as a function of a barometric pressure, which is dependent on a change in pressure in a sector of the fuel system.

SUMMARY

In an embodiment, the present invention provides a method for operating a hybrid vehicle, wherein the hybrid vehicle has an electric engine, an electric traction energy accumulator interacting with the electric engine, an internal combustion engine, and a fuel tank interacting with the internal combustion engine. The method includes starting from a purely electric driving mode in which the internal combustion engine is shut down and in which a shut-off valve of the fuel tank is closed, opening the shut-off valve of the fuel tank and starting up the internal combustion engine depending on defined operating conditions. The defined operating conditions include a current charging state of the traction energy accumulator and a current pressure in the fuel tank.

BRIEF DESCRIPTION OF THE DRAWINGS

The present invention will be described in even greater detail below based on the exemplary FIGURES. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawing which illustrates the following.

DETAILED DESCRIPTION

Embodiments of the invention provide methods for operating a hybrid vehicle and corresponding control devices with which the risk of hydrocarbon gas or fuel vapor escaping into the surroundings can be limited.

According to an embodiments of the invention, starting from the purely electric driving mode, the shut-off valve of the fuel tank is opened and the internal combustion engine is started up at least depending on a current charging state of the traction energy accumulator and depending on a current pressure in the fuel tank.

With a method according to an embodiment of the invention, it is proposed for the first time to open the shut-off valve of the fuel tank and to start up the internal combustion engine of the hybrid vehicle depending on the current charging state of the electric traction energy accumulator and depending on the current pressure in the fuel tank. By opening the shut-off valve of the fuel tank, the latter can be vented in a defined manner. Hydrocarbon gas escaping from the fuel tank or escaping fuel vapor is burned in a defined manner by the running internal combustion engine. Such a tank-pressure-dependent interruption of the electric driving mode permits an environmentally friendly operation of a hybrid vehicle.

In particular, it is provided that when the charging state of the electric traction energy accumulator is greater than a first limit value, i.e. is actually of a size sufficient in order to provide the desired driving power solely via the electric machine in the purely electric driving mode, and when furthermore the current pressure in the fuel tank is greater than a second limit value, the shut-off valve of the fuel tank can be opened and the internal combustion engine can be started up. After this, despite a sufficient charging state of the electric traction energy accumulator, the purely electric driving mode is then interrupted in order to vent the fuel tank and to burn hydrocarbons or fuel vapor in the internal combustion engine, and in order to reduce the risk of fuel vapor or hydrocarbons passing into the surroundings of the motor vehicle. Such a tank-pressure-dependent interruption of the electric driving mode permits a particularly environmentally friendly operation of a hybrid vehicle.

According to an embodiment of the invention, starting from the purely electric driving mode of the hybrid vehicle, the shut-off valve of the fuel tank is opened and the internal combustion engine is started up also depending on a current and/or future geodetic height or geodetic change in height of the hybrid vehicle. When the starting up of the internal combustion engine and the opening of the shut-off valve of the fuel tank additionally take place as a function of the current and/or future geodetic height or geodetic change in height of the motor vehicle, an even more advantageous operation of the hybrid vehicle is possible in order to further prevent the escape of hydrocarbons or fuel vapors into the surroundings.

According to a further advantageous development, starting from the purely electric driving mode of the hybrid vehicle, the shut-off valve of the fuel tank is opened and the internal combustion engine is started up also depending on a current ambient temperature or current change in ambient temperature. Accordingly, no fuel vapor or hydrocarbon gas passes into the surroundings.

According to an embodiment, starting from the purely electric driving mode, the internal combustion engine is also started up depending on a diagnostic function of the shut-off valve of the fuel tank. This embodiment of the invention is based on the finding that when, in the event of a diagnostic function, the shut-off valve of the fuel tank has to be opened in any case, the internal combustion engine should additionally be started in order to burn escaping hydrocarbon gas or fuel vapor in the internal combustion engine and thus to reduce the risk of same passing into the surroundings. Also with this development, an escape of the fuel vapor or hydrocarbon gas into the surroundings is prevented.

Embodiments of the invention relate to methods for operating a hybrid vehicle. Furthermore, embodiments of the invention relate to control devices for carrying such methods.

Figure 1:
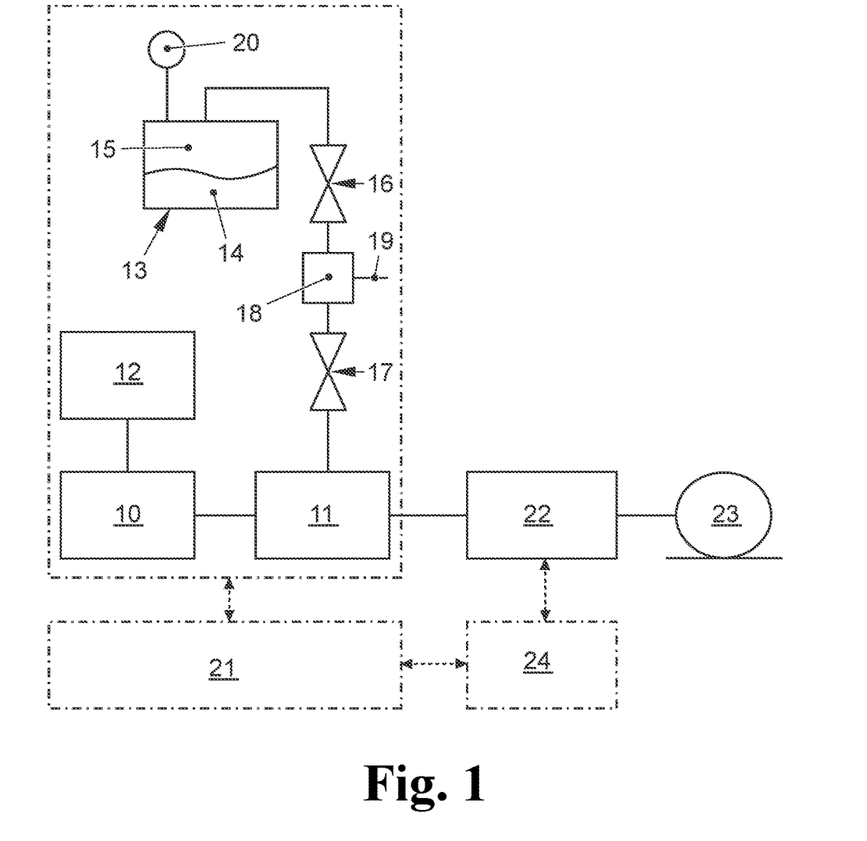
FIG. 1 shows a diagram of a hybrid vehicle.

The FIGURE shows a diagram of a hybrid vehicle, wherein the hybrid vehicle comprises an electric engine 10 and an internal combustion engine 11 as drive sources.

An electric traction energy accumulator 12 which is more intensely discharged in the motor mode of the electric engine 10 and is more intensely charged in the generator mode of the electric engine 10 interacts with the electric engine 10. A fuel tank 13 in which liquid fuel 14 is held interacts with the internal combustion engine 11. Said liquid fuel 14 can be supplied via fuel lines to the internal combustion engine 11 for combustion. Furthermore, fuel vapor 15 accumulates in the fuel tank 13.

The FIGURE furthermore shows a shut-off valve 16 of the fuel tank 13, which shut-off valve is closed when the internal combustion engine 11 is shut down, in order thus to prevent fuel vapor 15 or hydrocarbon gas from escaping from said fuel tank. When the internal combustion engine 11 is running, said shut-off valve 16 is opened, wherein fuel vapor 15 for burning can then be supplied to the internal combustion engine 11 depending on the position of at least one "venting valve" 17. In the case of internal combustion engines 11 having a plurality of cylinder banks, each cylinder bank of the internal combustion engine 11 is preferably assigned one such venting valve 17.

The FIGURE furthermore shows an activated carbon filter 18 which is connected between the shut-off valve 16 and the or each venting valve 17. The activated carbon filter 18 can be loaded with fuel vapor or hydrocarbons in order to absorb relevant quantities of fuel vapor or quantities of hydrocarbons escaping from the fuel tank 13.

Fresh air can be supplied to the activated carbon filter 18 via a fresh air connection 19. Should the loading of the activated carbon filter 18 with quantities of fuel vapor or quantities of hydrocarbons be too great, there is the risk of fuel vapor or hydrocarbons passing into the surroundings via the fresh air connection 19.

Furthermore, the FIGURE shows a pressure sensor 20 with which the pressure in the fuel tank 13 can be detected by measuring technology. Should the pressure in the fuel tank 13 exceed a limit value, the shut-off valve 16 has to be opened in order to avoid damage to the fuel tank 13.

The above described, drive-side assemblies 10 to 20 of the hybrid vehicle are bordered by chain-dotted boxes in the FIGURE. The operation of the internal combustion engine 11 and of the electric engine 10 is controlled and/or regulated via an engine control unit 21, for which purpose the engine control unit 21 exchanges data with defined drive-side assemblies. These include in particular the electric engine 10, the traction energy accumulator 12, the internal combustion engine 11, the pressure sensor 20 and the valves 16 and 17.

The FIGURE furthermore shows a transmission 22 which is connected between the drive sources 10, 11 and an output 23 of the hybrid vehicle. The transmission 22 converts rotational speeds and torques and thus provides the tractive effort of the hybrid drive, i.e. of the electric engine 10 and of the internal combustion engine 11, at the output 23. The operation of the transmission 22 is controlled or regulated by a transmission control device 24, wherein the transmission control unit 24 exchanges data both with the transmission 22 and with the engine control unit 21.

When a hybrid vehicle is operated in a purely electric driving mode, the internal combustion engine 11 is shut down, the shut-off valve 16 of the fuel tank 13 is closed and the electric engine 10 runs and is in particular operated in motor mode.

When the internal combustion engine 11 is shut down and the shut-off valve 16 of the fuel tank 13 is closed, the quantity of fuel vapor in the fuel tank 13 can increase depending on prevailing operating conditions of the hybrid vehicle, for example depending on the prevailing ambient pressure and on the prevailing ambient temperature, and therefore the pressure in the fuel tank 13 then rises.

If the pressure in the fuel tank 13 of the hybrid vehicle exceeds a limit value, the shut-off valve 16 of the fuel tank 13 has to be opened in order to rule out a risk of damage to the fuel tank 13. Then, depending on the state of loading of the activated carbon filter 18 with fuel vapor or with hydrocarbons, the fuel vapor or hydrocarbons can pass into the surroundings. This is intended to be avoided with the invention described below.

Within the context of the present invention here, it is proposed that, starting from a purely electric driving mode of the hybrid vehicle, in which the internal combustion engine 11 is shut down and the shut-off valve 16 of the fuel tank 13 is closed, the shut-off valve 16 of the fuel tank 13 is opened and the internal combustion engine 11 is started up at least depending on a current charging state of the electric traction energy accumulator 12 and depending on a current pressure in the fuel tank 13.

When the current charging state of the electric traction energy accumulator 12 is greater than a first limit value, namely is actually of such a size that the electric engine 10 could provide a desired driving power by itself at the output 23, and when furthermore the current pressure in the fuel tank 13, said pressure being detected by the pressure sensor 20, is greater than a second limit value, the shut-off valve 16 is opened in order to vent the fuel tank 13, and the internal combustion engine 11 is started up for a defined minimum period in order to burn fuel vapor emerging in this case from the fuel tank 13 or emerging hydrocarbon gases.

Accordingly, despite a sufficient charging state of the traction energy accumulator 12, it lies within the context of the invention to interrupt the purely electric driving mode and to start up the internal combustion engine 11, in order to reduce the pressure in the fuel tank 13 and, moreover, preferably also to reduce the loading of the activated carbon filter 18 with fuel vapor or hydrocarbons, and therefore the pressure in the fuel tank 13 is kept as low as possible and also the loading of the activated carbon filter 18 is kept as low as possible. Depending on the operating state of the internal combustion engine 11, the or each venting valve 17 is opened and closed in a defined manner in order to supply the hydrocarbons to the internal combustion engine 11 for burning.

The defined minimum period for which the internal combustion engine 11 is started up is of a sufficient size in order to reliably burn the hydrocarbons in the internal combustion engine 11. Said minimum period can be dependent on the loading state of the activated carbon filter 18 and on the operating state of the internal combustion engine 11.

According to an advantageous development of the invention, it is provided that, starting from the purely electric driving mode, the opening of the shut-off valve 16 of the fuel tank 13 and the starting up of the internal combustion engine 11 also takes place depending on a current and/or future geodetic height or geodetic change in height. When the geodetic height, in which the motor vehicle is operated currently and/or in the future, changes in the direction of an increasing geodetic height, the shut-off valve of the fuel tank 13 is opened and the internal combustion engine 11 is started up, namely if the charging state of the electric traction energy accumulator 12 is greater than the first limit value, and if furthermore the current pressure in the fuel tank 13 is greater than a third limit value, wherein the third limit value is smaller than the second limit value or corresponds thereto. The third limit value is preferably smaller than the second limit value, and therefore, when the geodetic height of the motor vehicle increases currently or in the future, the shut-off valve 16 has already been opened and the internal combustion engine 11 started up in order to reduce the pressure in the fuel tank 13 at an early point. If, by contrast, when the geodetic height changes in the direction of a decreasing geodetic height of the motor vehicle, the shut-off valve 16 of the fuel tank 13 is opened and the internal combustion engine 11 is started up if the current charging state of the electric traction energy accumulator 12 is greater than the first limit value, and the current pressure in the fuel tank is greater than a fourth limit value, wherein the fourth limit value is preferably greater than the second limit value. In this case, the reducing geodetic height, in which the motor vehicle is operated, causes a reduction in the pressure in the fuel tank 13, and therefore the starting up of the internal combustion engine 11 can then be delayed or prevented.

The current, in particular the future geodetic height, in which the hybrid vehicle is operated is preferably determined depending on data of a navigation system. The navigation system provides route data which also include information about the geodetic height of the particular route, and therefore the current and/or future geodetic height or geodetic change in height can thereby be taken into consideration in a particularly simple manner in a method according to an embodiment of the invention.

According to a further advantageous embodiment of the invention, it is provided that, starting from the purely electric driving mode, the starting up of the internal combustion engine 11 and the opening of the shut-off valve 16 of the fuel tank 13 take place depending on a current ambient temperature or change in ambient temperature of the motor vehicle. When the ambient temperature changes in the direction of an increasing ambient temperature, the shut-off valve 16 of the fuel tank 13 is opened and the internal combustion engine 11 is started up if the current charging state of the electric traction energy accumulator 12 is greater than the first limit value and, furthermore, the current pressure in the fuel tank 13 is greater than a fifth limit value, wherein the fifth limit value is smaller than the second limit value or corresponds thereto. In particular, the fifth limit value is smaller than the second limit value, and therefore, when the ambient temperature, in which the hybrid vehicle is operated, increases, the fuel tank 13 is already opened at a lower pressure in the fuel tank 13 and, accordingly, the internal combustion engine 11 is started up. By contrast, when the ambient temperature of the hybrid vehicle changes in the direction of a decreasing ambient temperature, the shut-off valve 16 of the fuel tank 13 is opened and the internal combustion engine 11 is started up if the current charging state of the electric energy accumulator 12 is greater than the first limit value and the current pressure in the fuel tank is greater than a sixth limit value, wherein the sixth limit value is preferably greater than the second limit value. If the ambient temperature is then reduced, the pressure in the fuel tank 13 drops solely because of the reduction in the ambient temperature, and therefore the starting up of the internal combustion engine 11 can be delayed or prevented.

According to a further advantageous development, it is provided that, starting from the purely electric driving mode, the internal combustion engine 11 is also started up depending on a diagnostic function of the shut-off valve 16. It is thus customary to check the function of the shut-off valve 16 of the fuel tank 13 by the fact that said shut-off valve is opened. In this operating state, it is then appropriate to additionally start up the internal combustion engine 11 for a defined minimum period of time in order in a controlled manner to burn the fuel vapor emerging from the fuel tank 13 or the hydrocarbons in the internal combustion engine 11 and preferably, furthermore, to reduce the loading state of the activated carbon filter 18.

Accordingly, an embodiment of the invention relates to an interruption of the purely electric driving mode, specifically if, because of the charging state of the electric traction energy accumulator 12, the driving power which is required at the output 23 could actually be provided solely by the electric engine 10 in the purely electric driving mode. If, in this case, the pressure prevailing in the fuel tank 13, which pressure can be dependent on the geodetic height or change in height and/or the ambient temperature or change in ambient temperature, is above a limit value, the shut-off valve 16 of the fuel tank 13 is opened and the internal combustion engine 11 is started up.

By this means, the fuel tank 13 is vented, escaping fuel vapor or escaping hydrocarbon is burned in the internal combustion engine 11, specifically by targeted activation of the or each venting valve 17. Furthermore, the loading state of the activated carbon filter 18 with hydrocarbons can be reduced here.

Embodiments of the invention furthermore relate to a control device for operating a hybrid vehicle, which control device carries out methods according to embodiments of the invention by a controller. Said control device is preferably the engine control unit 21 of the FIGURE, which controls and/or regulates both the operation of the internal combustion engine 11 and the operation of the electric engine 10. It is also possible for separate engine control units to be kept ready for the electric engine 10 and the internal combustion engine 11, wherein one of said engine control units can then carry out a method according to the invention by a controller.

Figure 2:
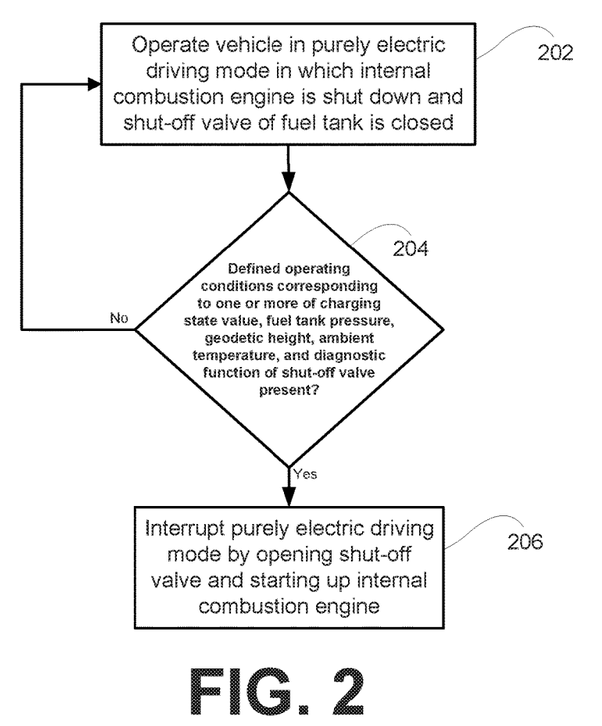
FIG. 2 is a flow chart illustrating steps of a method according to an embodiment of the invention.

FIG. 2 is a flow chart illustrating steps of a method according to an embodiment of the invention. At 202, the vehicle is operated in a purely electric driving mode in which the internal combustion engine is shut down, and in which a shut-off valve of the fuel tank is closed. At 204, it is determined whether defined operating conditions are present. The defined operating conditions correspond to one or more of a charging state value, a fuel tank pressure, a geodetic height, an ambient temperature, and a diagnostic function of the shut-off valve. If the defined operating conditions are not present, the vehicle continues to be operated in the purely electric driving mode. If the defined operating conditions are present, the purely electric driving mode is interrupted at 206 by opening the shut-off valve and starting up the internal combustion engine.

Figure 3:
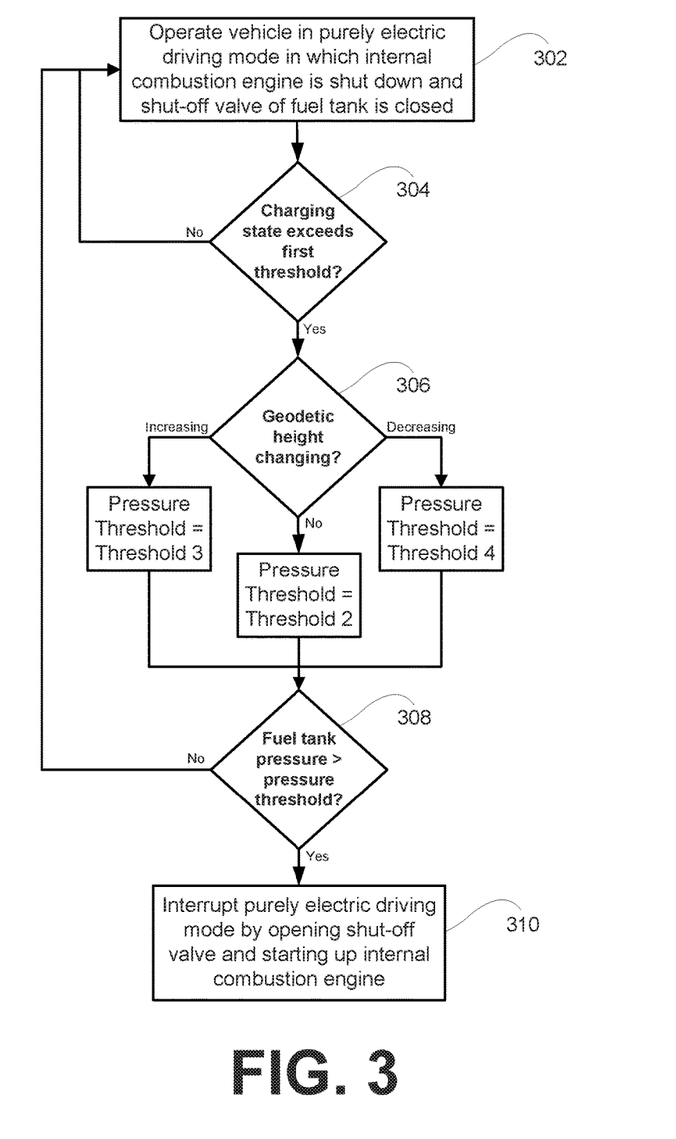
FIG. 3 is a flow chart illustrating steps of a method according to an embodiment of the invention.

FIG. 3 is a flow chart illustrating steps of a method according to an embodiment of the invention. At 302, the vehicle is operated in a purely electric driving mode in which the internal combustion engine is shut down, and in which a shut-off valve of the fuel tank is closed. At 304, it is determined whether the charging state of the vehicle exceeds a first threshold. If the charging state of the vehicle exceeds the first threshold, the method proceeds to 306. If the charging state of the vehicle does not exceed the first threshold, the method returns to 302. At 306, the method determines whether the geodetic height of the vehicle is changing. The geodetic height can be determined using data from a navigation system. If the geodetic height of the vehicle is not changing, a pressure threshold is set to a second threshold. If the geodetic height of the vehicle is increasing, the pressure threshold is set to a third threshold that is smaller than the second threshold. If the geodetic height of the vehicle is decreasing, the pressure threshold is set to a fourth threshold that is greater than the second threshold. At 308, the method determines whether the fuel tank pressure of the vehicle exceeds the pressure threshold. The fuel tank pressure of the vehicle can be measured by a pressure sensor. If the fuel tank pressure exceeds the pressure threshold, the method proceeds to 310. If the fuel tank pressure does not exceed the pressure threshold, the method returns to 302. At 310, the purely electric driving mode is interrupted by opening the shut-off valve and starting up the internal combustion engine.

Figure 4:
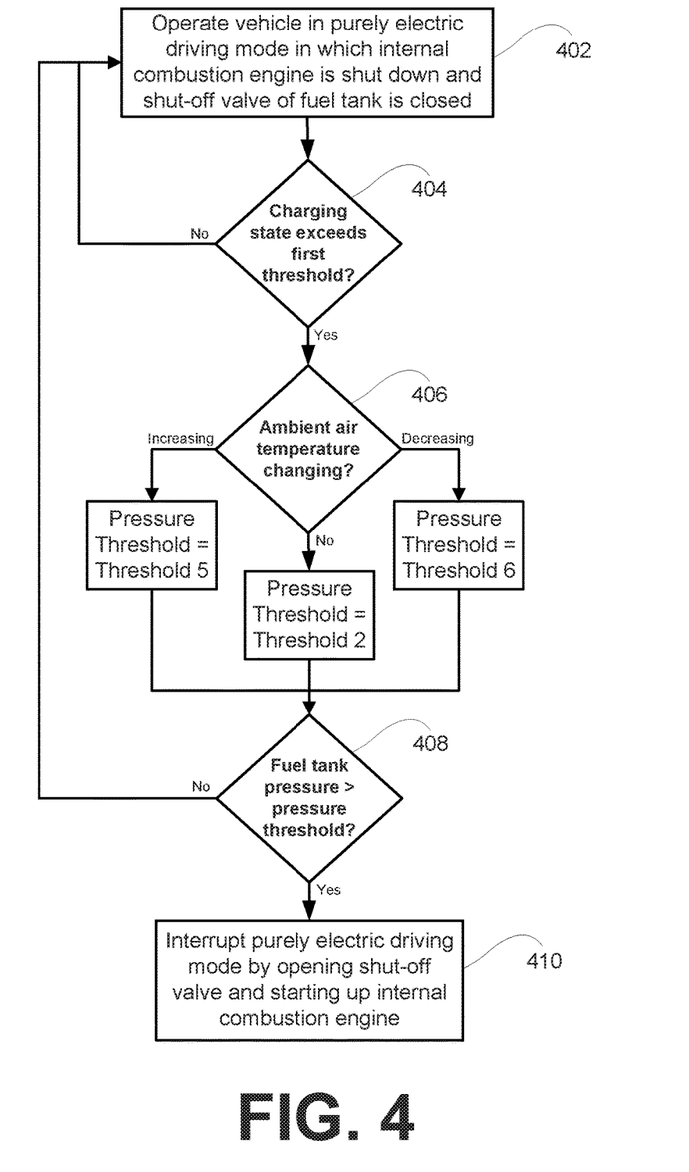
FIG. 4 is a flow chart illustrating steps of a method according to an embodiment of the invention.

FIG. 4 is a flow chart illustrating steps of a method according to an embodiment of the invention. At 402, the vehicle is operated in a purely electric driving mode in which the internal combustion engine is shut down, and in which a shut-off valve of the fuel tank is closed. At 404, it is determined whether the charging state of the vehicle exceeds a first threshold. If the charging state of the vehicle exceeds the first threshold, the method proceeds to 406. If the charging state of the vehicle does not exceed the first threshold, the method returns to 402. At 406, the method determines whether ambient temperature outside the vehicle is changing. If the ambient temperature outside the vehicle is not changing, a pressure threshold is set to a second threshold. If the ambient temperature outside the vehicle is increasing, the pressure threshold is set to a fifth threshold that is smaller than the second threshold. If ambient temperature of the vehicle is decreasing, the pressure threshold is set to a sixth threshold that is greater than the second threshold. At 408, the method determines whether the fuel tank pressure of the vehicle exceeds the pressure threshold. The fuel tank pressure of the vehicle can be measured by a pressure sensor. If the fuel tank pressure exceeds the pressure threshold, the method proceeds to 410. If the fuel tank pressure does not exceed the pressure threshold, the method returns to 402. At 410, the purely electric driving mode is interrupted by opening the shut-off valve and starting up the internal combustion engine.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for operating a hybrid vehicle, wherein the hybrid vehicle has an electric engine, an electric traction energy accumulator interacting with the electric engine, an internal combustion engine, and a fuel tank interacting with the internal combustion engine, the method comprising:

operating the hybrid vehicle in a purely electric driving mode in which a required driving power is delivered solely by the electric engine, in which the internal combustion engine is shut down, and in which a shut-off valve of the fuel tank is closed;

determining that defined operating conditions are present; and in response to determining that the defined operating conditions are present, interrupting the purely electric driving mode by opening the shut-off valve of the fuel tank and starting up the internal combustion engine to burn fuel vapor, wherein the defined operating conditions include a current charging state value of the traction energy accumulator being greater than a first limit value and a current pressure in the fuel tank being greater than a second limit value, and wherein the first limit value is a charging state value sufficient to provide the required driving power solely by the electric engine.

2. The method as claimed in claim 1, wherein the current pressure in the fuel tank is measured by a pressure sensor, and wherein determining that the defined operating conditions are present includes determining that a pressure value measured by the pressure sensor exceeds the second limit value.

3. The method as claimed in claim 1, wherein the defined operating conditions further include a current and/or future geodetic height or geodetic change in height.

4. The method as claimed in claim 3, wherein when the geodetic height changes in a direction of an increasing geodetic height, the shut-off valve of the fuel tank is opened and the internal combustion engine is started up if the current charging state of the electric traction energy accumulator is greater than the first limit value and the current pressure in the fuel tank is greater than a third limit value, wherein the third limit value is smaller than the second limit value.

5. The method as claimed in claim 3, wherein when the geodetic height changes in a direction of a decreasing geodetic height, the shut-off valve of the fuel tank is opened and the internal combustion engine is started up if the current charging state of the electric traction energy accumulator is greater than the first limit value and the current pressure in the fuel tank is greater than a fourth limit value, wherein the fourth limit value is greater than the second limit value.

6. The method as claimed in claim 3, wherein a future geodetic height or change in height is determined depending on data of a navigation system.

7. The method as claimed in claim 1, wherein the defined operating conditions further include a current ambient temperature or change in ambient temperature.

8. The method as claimed in claim 7, wherein when the ambient temperature changes in the direction of an increasing ambient temperature, the shut-off valve of the fuel tank is opened and the internal combustion engine is started up if the current charging state of the electric traction energy accumulator is greater than the first limit value and the current pressure in the fuel tank is greater than a fifth limit value, wherein the fifth limit value is smaller than the second limit value.

9. The method as claimed in claim 7, wherein when the ambient temperature changes in the direction of a decreasing ambient temperature, the shut-off valve of the fuel tank is opened and the internal combustion engine is started up if the current charging state of the electric traction energy accumulator is greater than the first limit value and the current pressure in the fuel tank is greater than a sixth limit value, wherein the sixth limit value is greater than the second limit value.

10. The method as claimed in claim 1, wherein the defined operating conditions further include a diagnostic function of the shut-off valve of the fuel tank.

11. A control device for operating a hybrid vehicle, wherein the hybrid vehicle has an electric engine, an electric traction energy accumulator interacting with the electric engine, an internal combustion engine, and a fuel tank interacting with the internal combustion engine, the control device comprising:

a controller configured to, when the vehicle is being operated in a purely electric driving mode in which a required driving power is delivered solely by the electric engine, in which the internal combustion engine is shut down, and in which a shut-off valve of the fuel tank is closed, determine that defined operating conditions are present, and in response to determining that the defined operating conditions are present, interrupt the purely electric driving mode by opening a shut-off valve of the fuel tank and starting up the internal combustion engine to burn fuel vapor, wherein the defined operating conditions include a current charging state value of the traction energy accumulator being greater than a first limit value and on a current pressure in the fuel tank being greater than a second limit value, and wherein the first limit value is a charging state value sufficient to provide the required driving power solely by the electric engine.

12. A method for operating a hybrid vehicle, wherein the hybrid vehicle has an electric engine, an electric traction energy accumulator interacting with the electric engine, an internal combustion engine, and a fuel tank interacting with the internal combustion engine, the method comprising:

starting from a purely electric driving mode in which the internal combustion engine is shut down and in which a shut-off valve of the fuel tank is closed, opening the shut-off valve of the fuel tank and starting up the internal combustion engine depending on defined operating conditions, wherein the defined operating conditions include a current charging state of the traction energy accumulator and a current pressure in the fuel tank, wherein when the current charging state of the electric traction energy accumulator is greater than a first limit value and the current pressure in the fuel tank is greater than a second limit value, the shut-off valve is opened in order to vent the fuel tank and the internal combustion engine is started up in order to burn fuel vapor or hydrocarbon gas emerging from the fuel tank, wherein the defined operating conditions further include a current and/or future geodetic height or geodetic change in height, and wherein the future geodetic height or change in height is determined depending on data of a navigation system.

* * * * *